US011856507B2

(12) United States Patent
Yang et al.

(10) Patent No.: US 11,856,507 B2
(45) Date of Patent: Dec. 26, 2023

(54) NETWORK SEARCH AND CONFIGURING METHOD, REGISTRATION METHOD, DEVICE AND SYSTEM

(71) Applicant: SHENZHEN UCLOUDLINK NEW TECHNOLOGY CO., LTD., Guangdong (CN)

(72) Inventors: Bing Yang, Guangdong (CN); Zhihui Gong, Guangdong (CN)

(73) Assignee: SHENZHEN UCLOUDLINK NEW TECHNOLOGY CO., LTD., Guangdong (CN)

( * ) Notice: Subject to any disclaimer, the term of this patent is extended or adjusted under 35 U.S.C. 154(b) by 190 days.

(21) Appl. No.: 17/330,466

(22) Filed: May 26, 2021

(65) Prior Publication Data

US 2021/0282080 A1 Sep. 9, 2021

Related U.S. Application Data

(63) Continuation-in-part of application No. PCT/CN2020/095645, filed on Jun. 11, 2020.

(30) Foreign Application Priority Data

Jun. 24, 2019 (CN) .......................... 201910547638.X

(51) Int. Cl.
*H04W 48/16* (2009.01)
*H04W 8/04* (2009.01)
(Continued)

(52) U.S. Cl.
CPC ............. *H04W 48/16* (2013.01); *H04W 8/04* (2013.01); *H04W 8/183* (2013.01); *H04W 60/00* (2013.01); *H04W 72/56* (2023.01); *H04W 84/042* (2013.01)

(58) Field of Classification Search
CPC ....... H04W 48/16; H04W 8/04; H04W 8/183; H04W 72/56; H04W 84/042; H04W 60/00
See application file for complete search history.

(56) References Cited

U.S. PATENT DOCUMENTS

2010/0291924 A1 11/2010 Antrim et al.
2013/0231111 A1* 9/2013 Ito ......................... H04W 48/16
455/434
(Continued)

FOREIGN PATENT DOCUMENTS

CN 102056135 A 5/2011
CN 103906180 A 7/2014
(Continued)

OTHER PUBLICATIONS

Global System for Mobile Communications: 3rd Generation Partnership Project; Technical Specification Group services and Systems Aspects; Review of Network Selection Principles; (Release 7); 3GPP TR 22.811 v7.2.0 (Jun. 2006); pp. 1-15.
(Continued)

*Primary Examiner* — Wayne H Cai
(74) *Attorney, Agent, or Firm* — Robert L. Stearns; Dickinson Wright PLLC

(57) ABSTRACT

A network search and configuration method, a registration method, a device, and a system are provided. The network search and configuration method is applied to a server, and comprises: receiving a service request carrying location information sent by a communication terminal; obtaining various optimal parameters in a SIM card to be registered corresponding to the location information according to the service request; dynamically configuring the various parameters in the SIM card to be registered according to various optimal parameters; and sending the dynamically configured SIM card to be registered to the communication terminal in
(Continued)

order that the communication terminal searches and registers a network for the SIM card to be registered according to various configured parameters accordingly.

5 Claims, 6 Drawing Sheets

(51) Int. Cl.
    *H04W 8/18* (2009.01)
    *H04W 60/00* (2009.01)
    *H04W 72/56* (2023.01)
    *H04W 84/04* (2009.01)

(56) References Cited

U.S. PATENT DOCUMENTS

2019/0159101 A1* 5/2019 Yu .................... H04W 36/32
2019/0159115 A1* 5/2019 Russell ............... H04L 65/1073

FOREIGN PATENT DOCUMENTS

| CN | 105359600 A | 2/2016 |
|---|---|---|
| CN | 106131931 A | 11/2016 |
| CN | 106231655 A | 12/2016 |
| CN | 106961711 A | 7/2017 |
| CN | 108235406 A | 7/2017 |
| CN | 108322908 A | 7/2018 |
| CN | 109104718 A | 12/2018 |
| CN | 109155899 A | 1/2019 |
| CN | 109275135 A | 1/2019 |
| CN | 109862607 A | 6/2019 |
| CN | 110248357 A | 9/2019 |
| EP | 2434816 A2 | 3/2012 |
| EP | 3024254 A1 | 5/2016 |
| EP | 2879442 B1 | 11/2016 |
| EP | 3324660 A1 | 5/2018 |
| WO | 2015055754 A1 | 4/2015 |
| WO | 2016145742 A1 | 9/2016 |
| WO | 2016202174 A1 | 12/2016 |

OTHER PUBLICATIONS

Research in Motion, Periodic Network Selection Attempts for Non-3GPP; 3GPP TSG CT WG1 Meeting #59; Los Angeles (USA), Jun. 22-26, 2009, Change Request C1-092882, pp. 1-6.

* cited by examiner

NETWORK SEARCH AND CONFIGURING METHOD, REGISTRATION METHOD, DEVICE AND SYSTEM

CROSS REFERENCE TO RELATED APPLICATION

This application is a continuation-in-part of PCT patent application Serial No. PCT/CN2020/095645, with an international filing date of Jun. 11, 2020, which claims priority to Chinese patent application No. 201910547638.X filed with CNIPA on Jun. 24, 2019 and entitled "a network search and configuration method, a registration method, a device, and a system", the disclosure of which is incorporated herein by reference in entirety.

TECHNICAL FIELD

The present disclosure relates to the technical field of communication technology, and particularly relates to a network search and configuration method, a network search and registration method, and a system.

BACKGROUND

In recent years, updating speed of mobile communication network is faster and faster with the rapid development of mobile communication technology. In the rapid development process of mobile networks, new network carriers enter the field of mobile communications continuously, international market is explored by some conventional carriers by entering some emerging countries.

When the new carrier and the traditional carrier enter emerging market, they usually establish a new generation of communication network, for example, if there is a GSM (Global System for Mobile Communications) network coverage originally, a 3G (The Third Generation Telecommunication) network is established, if there is 3G network coverage originally, a LTE (Long Term Evolution) network is established. In the establishing process of network, in one aspect, since the new established network cannot achieve seamless and full coverage of the area quickly, in another aspect, the new established network and the old network have different characteristics and have mutual compensation, thus, a situation of coexistence of multiple networks in relatively long period of time occurs. However, these new carriers are not likely to establish all mobile networks of access technologies all by themselves, it is a common practice for these new carriers to sign roaming agreements with some local carriers in order to take advantage of all local mobile networks.

3GPP (3rd Generation Partnerships Project) is an International Organization for Standardization, priorities of HPLMN, EHPLMN, UPLMN, OPLMN which are used for controlling and selecting networks are defined in the protocol, these information needs to be stored in the SIM card; however, once a SIM card is allocated to a user, the information cannot be modified, however, there are so many global mobile communication networks, it is unpractical and impossible to list all these network carriers in the SIM card completely. Meanwhile, due to the fact that the various parameters in the SIM card to be registered is irrevocably written by a carrier and cannot be modified, the structure and the state of the network are changed at any time, and roaming relationships among carriers may also be changed due to various reasons, which may cause the problems including poor registration network, longer registration time, and too expansive tariff of the registered network.

Technical Problem

Embodiments of the present disclosure provide a network search and configuration method, a registration method, and a system, which aims at solving a technical problem in the prior art that a fast search and registration of optimal network cannot be realized.

Technical Solution

Embodiments of the present disclosure are realized in this manner, a network search and configuration method is provided, this method is applied to a server and comprises:
  receiving a service request carrying location information sent by a communication terminal;
  obtaining various optimal parameters in a SIM card to be registered corresponding to the location information according to the service request;
  dynamically configuring the various parameters in the SIM card to be registered according to various optimal parameters; and
  sending the dynamically configured SIM card to be registered to the communication terminal in order that the communication terminal searches and registers network for the SIM card to be registered accordingly according to various configured parameters.

Furthermore, the various parameters comprise a RPLMN; the step of dynamically configuring the various parameters in the SIM card to be registered according to the various optimal parameters comprises:
  obtaining a prioritization of a PLMN list corresponding to the location information;
  determining whether the RPLMN stored in the SIM card to be registered is a PLMN with the highest priority in the PLMN list; and
  dynamically configuring the RPLMN in the SIM card to be registered as the PLMN with the highest priority in the PLMN list, if it is determined that the RPLMN stored in the SIM card to be registered is not the PLMN with the highest priority in the PLMN list.

Furthermore, the various parameters comprise an EHPLMN and a HPLMN;
  the step of dynamically configuring the various parameters in the SIM card to be registered according to the various optimal parameters comprises:
  obtaining a HPLMN stored in the SIM card to be registered;
  determining a target EHPLMN corresponding to the HPLMN stored in the SIM card to be registered; and
  dynamically configuring the EHPLMN in the SIM card to be registered as the target EHPLMN.

Furthermore, the various parameters comprise an OPLMN and an UPLMN;
  the step of dynamically configuring the various parameters in the SIM card to be registered according to the various optimal parameters comprises:
  obtaining a prioritization of a PLMN list corresponding to the location information; and
  dynamically configuring the OPLMN and the UPLMN in the SIM card to be registered in order according to the prioritization in the PLMN list.

Furthermore, the step of obtaining the prioritization of the PLMN list corresponding to the location information comprises:

obtaining strengths of network signals of multiple PLMNs, time spent on searching and registering network of the multiple PLMNs, and user experiences fed back by PLMNs that have been searched and registered, which are historically reported by multiple communication terminals according to the location information;

obtaining tariff conditions of the multiple PLMNs in the PLMN list corresponding to the location information; and determining the prioritization of the multiple PLMNs in the PLMN list according to the strengths of network signals, the time spent on searching and registering network, the user experiences, and the tariff conditions.

Furthermore, the various parameters comprise a FPLMN;

the step of dynamically configuring the various parameters in the SIM card to be registered according to the various optimal parameters comprises:

obtaining strengths of network signals of multiple PLMNs, time spent on searching and registering network of the multiple PLMNs, and user experiences fed back by PLMNs that have been searched and registered, which are historically reported by multiple communication terminals according to the location information;

obtaining tariff conditions of the multiple PLMNs in the PLMN list corresponding to the location information;

configuring a PLMN of which a network signal strength is weaker than a preset signal strength, a time spent on searching and registering network is longer than a preset registration time, a tariff is higher than a preset tariff, and a user experience value is lower than a preset user experience value into the FPLMN of the SIM card to be registered according to the strengths of network signals of the multiple PLMNs, the time spent on searching and registering network of the multiple PLMNs and user experiences fed back by PLMNs that have been searched and registered, which are historically reported by multiple communication terminals according to the location information.

Furthermore, the various parameters comprise a HPPLMN search timer;

the step of dynamically configuring the various parameters in the SIM card to be registered according to the various optimal parameters comprises:

dynamically configuring the HPPLMN search timer in the SIM card to be registered according to the location information.

Another network search and registration method is provided in embodiments of the present disclosure, this network search and registration method is applied in a communication terminal and comprises following steps of:

obtaining location information of a current location of the communication terminal;

sending a service request carrying location information to a server in order that the server dynamically configures various parameters in the SIM card to be registered according to the location information;

receiving the SIM card to be registered having the various dynamically configured parameters, which is sent by the server; and searching and registering network for the SIM card to be registered accordingly according to the various configured parameters.

Furthermore, the various parameters comprise a RPLMN, an EHPLMN and a HPLMN;

the step of searching and registering network for the SIM card to be registered accordingly according to the various configured parameters comprises:

searching and registering network for the SIM card to be registered accordingly according to the RPLMN parameter, if the SIM card to be registered is configured with the RPLMN parameter; or searching and registering network for the SIM card to be registered accordingly according to the EHPLMN parameter, if the SIM card to be registered is not configured with the RPLMN parameter.

Furthermore, the various parameters comprise an OPLMN and an UPLMN;

the step of searching and registering network for the SIM card to be registered accordingly according to the various configured parameters comprises:

searching and registering network for the SIM card to be registered according to the UPLMN parameter or the OPLMN parameter in the event that searching and registering network for the SIM card to be registered according to the RPLMN parameter is failed and the communication terminal is determined to be located at a roaming place according to the location information.

Furthermore, the various parameters comprise a FPLMN and a HPPLMN search timer;

the step of searching and registering network for the SIM card to be registered accordingly according to the various configured parameters comprises:

prohibiting searching and registering network corresponding to the FPLMN parameter in the SIM card to be registered according to the FPLMN parameter; and searching and registering network of high priority for the SIM card to be registered again according to the HPPLMN search timer parameter, after a time which is determined by the HPPLMN search timer is reached.

Embodiments of the present disclosure further provide a network search, configuration and registration system, comprising:

a communication terminal and a server being in communication with the communication terminal;

wherein the server is configured to:

receive a service request carrying location information sent by the communication terminal;

obtain various optimal parameters in a SIM card to be registered corresponding to the location information according to the service request;

dynamically configure the various parameters in the SIM card to be registered according to various optimal parameters; and send the dynamically configured SIM card to be registered to the communication terminal;

the communication terminal is configured to:

receive the SIM card to be registered which includes various dynamically configured parameters from the server; and search and register network for the SIM card to be registered accordingly according to the various dynamically configured parameters.

Advantageous Effects

In the network search and registration method according to the embodiments of the present disclosure, the server determines various optimal parameters corresponding to the SIM card to be registered by obtaining the current location of the communication terminal, and dynamically configures the various optimal parameters into the SIM card to be registered to allow the parameters in the SIM card to be registered to be modified, and sends the SIM card to be registered to the communication terminal, so that the communication terminal is enabled to quickly search and register a network for the SIM card to be registered according to the parameters with modified configurations; however, due to the fact that the various parameters in the SIM card to be registered is irrevocably written by the carrier and cannot be modified in the prior art, problems including poor registered network, longer registration time and more expansive tariff of registered network are caused; the technical problem in the prior art that a fast search and registration of optimal network cannot be realized has been solved in the present disclosure.

DESCRIPTION OF THE EMBODIMENTS

In order to make the purpose, the technical solution and the advantages of the present disclosure be clearer and more understandable, the present disclosure will be further described in detail below with reference to accompanying figures and embodiments. It should be understood that the detailed embodiments described herein are merely intended to illustrate but not to limit the present disclosure.

According to the network search and configuration method provided by the embodiment of the present disclosure, the server receives a service request carrying location information sent by a communication terminal 1, obtains various optimal parameters in the SIM card to be registered corresponding to the location information according to the service request, dynamically configures various parameters in the SIM (Subscriber Identity Module) card to be registered according to the various optimal parameters, and sends the dynamically configured SIM card to be registered to the communication terminal 1, so that the communication terminal 1 is enabled to search and register a network for the SIM card to be registered according to the various configured parameters. By dynamically configuring various parameters in the SIM card to be registered according to the obtained location information, such that various optimal parameters can be configured into the SIM card to be registered, and the SIM card to be registered is sent to the communication terminal 1 so that the communication terminal 1 is enabled to realize a fast search and registration of network for the SIM card to be registered according to the various parameters with modified configurations, and the problems including poor registration network, longer registration time, and more expensive of registered network caused to because that the various parameters in the SIM card to be registered are irrevocably written by the carrier and cannot be modified are solved.

Figure 1:
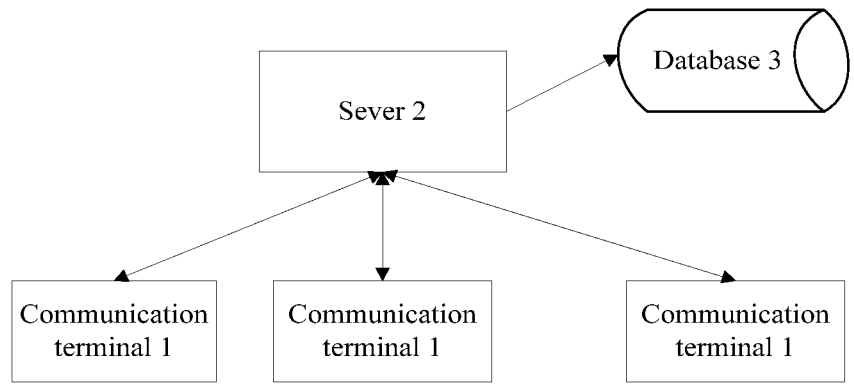
FIG. 1 illustrates a diagram of an implementation environment of a system for searching, configuring and registering network according to the present disclosure.

FIG. 1 illustrates an implementation environment of a network search, configuration and registration system according to one embodiment of the present disclosure. For the convenience of description, the part associated with the embodiment of the present disclosure is merely illustrated.

Referring to FIG. 1, a communication terminal 1 obtains its current location according to the network, and sends a service request carrying location information to the server 2, the server 2 obtains a PLMN list corresponding to the location information by querying a database 3 according to the location information, obtains the various optimal parameters correspondingly according to the PLMN list and dynamically configures various parameters in the SIM card to be registered according to the obtained various optimal parameters, and sends the dynamically configured SIM card to be registered, the communication terminal 1 receives the SIM card to be registered, and search and register a network for the SIM card to be registered corresponding according to the configured various parameters, thereby realizing a fast registration of optimal network.

In this embodiment of the present disclosure, a network may provide the communication terminal 1 with a communication link that communicates with one or multiple servers 2 through such as a base station, in particular, in this embodiment, the network can be a mobile network or the like. The server 2 may provide the communication terminal 1 with any of a variety of services. For example, the server 2 can provide a database that allows the communication terminal 1 to access any one of various information by querying, a cloud-based service such as a media streaming transmission service, a smart personal assistant service, or a mapping service, an email server, or any other various functions. As a specific possibility, the server 2 may store a database that includes information regarding a PLMN (Public Land Mobile Network) deployed at different regions, mobile country codes, etc., in particular, the database 3 stores network performance information reported by various communication terminals 1. The communication terminal 1 can be a cell phone, a MiFi, a handheld device, a computer or a tablet, or almost any type of wireless device. The communication terminal 1 can communicate according to a variety of wireless communication standards. For example, the communication terminal 1 can be configured to communicate using two or more of GSM (Global System for Mobile Communications), UMTS (Universal Mobile Telecommunications System), CDMA (Code Division Multiple Access) 2000, Wimax (World Interoperability for Microwave Access), LTE (Long Term Evolution), LTE-A (Long Term Evolution-Advanced), WLAN (Wireless Local Area Network), Bluetooth, one or a plurality of GNSS (Global Navigation Satellite Systems) (e.g., GPS or GLONASS), and one and/or a plurality of mobile television broadcast standards (e.g., ATSC-M/H or DVB-H), etc.

Embodiment One

Figure 2:
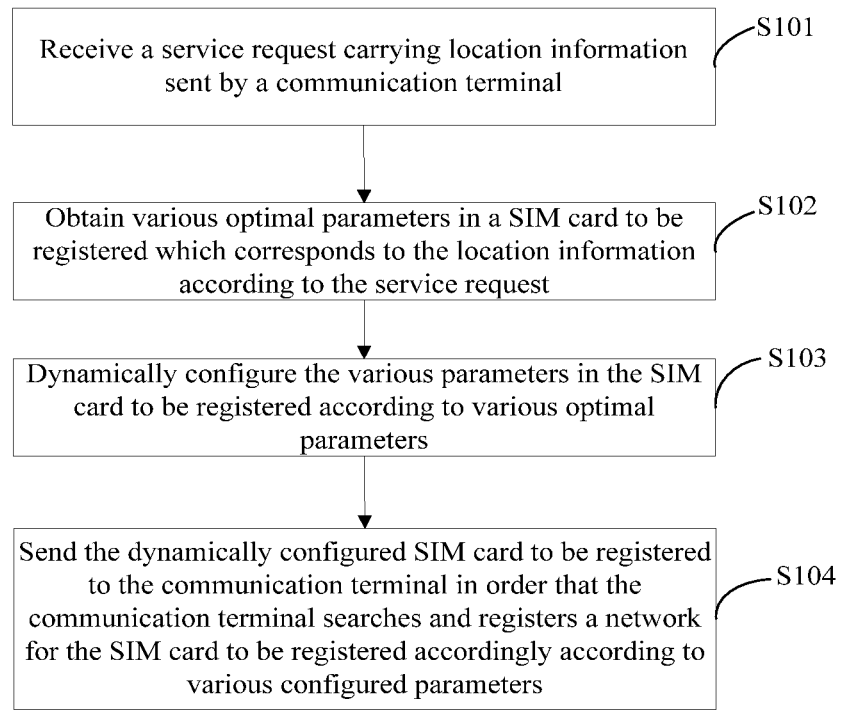
FIG. 2 illustrates an implementation flowchart of a network search and configuration method according to embodiment one of the present disclosure.

FIG. 2 illustrates an implementation flowchart of a network search and configuration method according to one embodiment of the present disclosure. For the convenience of description, the part associated with this embodiment of the present disclosure is shown. The network search and configuration method is applied to a server 2, and includes:

In a step of S101, receiving a service request carrying location information sent by the communication terminal 1.

In this embodiment of the present disclosure, the communication terminal 1 may attempt to determine its position or location information associated with its position. The position of the communication terminal 1 can be determined according to one of a plurality of approaches. As one possibility, the communication terminal 1 may determine its position according to location information based on GNSS (Global Navigation Satellite System), terrestrial broadcast information (e.g., FM radio broadcast, television broadcast, etc.), Wi-Fi based information, information obtained via Bluetooth communications, and/or any other information. Therefore, the communication terminal 1 sends the service request carrying the location information to the server 2 in the manner such as Wi-Fi after obtaining the location information, the server 2 can receive the service request carrying the location information sent by the communication terminal 1.

In this embodiment of the present disclosure, the service request further includes user identification information, service type information requested by the user, and the like. Wherein the user identification information is identification name or identification number, and is used for uniquely identifying the same communication terminal 1, so that the server 2 can send a message to the corresponding communication terminal 1 according to the user identification information.

In a step of S102, obtaining various optimal parameters in the SIM card to be registered corresponding to the location information according to the service request.

In this embodiment of the present disclosure, the SIM card to be registered for which the communication terminal 1 needs to search and register network is specifically a virtual subscriber identity module card, and this virtual subscriber identity module card is a SIM card which is not previously inserted or arranged in the communication terminal 1, but needs to be downloaded from the server 2.

Meanwhile, due to the fact that the virtual SIM card is a SIM card which is a complete software card of a physical SIM card, various parameters in the virtual SIM card can be set, however, parameters in the physical SIM card are irrevocable and cannot be modified, in this situation, various SIM card data can be written into the virtual SIM card, and the SIM card data written into the virtual SIM card includes but is not limited to one or a combination of telephone number, ICCID (Integrated Circuit Card Identity), IMSI (International Mobile Subscriber Identity), authentication key, short message center, PLMN (Public Land Mobile Network).

In this situation, server 2 obtains various optimal parameters in the SIM card to be registered correspondingly according to the location information in the service request after receiving the service request, and thus configures the SIM card to be registered using the various optimal parameters.

In this embodiment of the present disclosure, the various parameters include but are not limited to one or more of RPLMN, EHPLMN, HPLMN, VPLMN, UPLMN, OPLMN, FPLMN, HPPLMN search timer.

In particular, PLMN (Public Land Mobile Network) is established by a government or a carrier approved by the government and is for the purpose of providing terrestrial mobile communication service for the public. PLMN=MCC+MNC; Further, MCC, that is, mobile country code, resources of the MCC are uniformly allocated and managed by ITU (International Telecommunication Union), which uniquely identify the country where a mobile user is located in, the mobile country code has 3 bits, for example, China is identified as 460, Japan is identified as 440 and 441, thus, for example, according to the calculation of PLMN, the PLMN of China mobile is determined as 46001, 46002, 46007, the PLMN of China Unicom is determined as 46001, 46006, and the PLMN of China telecommunications is determined as 46003, 46005.

In particular, the RPLMN is abbreviation of registered PLMN, which is divided into a PS/RPLMN, an EPS RPLMN, and a CS RPLMN, and is primarily a PLMN registered by the communication terminal prior to a last shutdown or off-line.

In particular, the EHPLMN is abbreviation of equivalent home PLMN, which is a local PLMN which has the same position as the PLMN currently selected by the communication terminal 1.

In particular, the HPLMN is abbreviation of Home PLMN which is the PLMN which the subscriber of the communication terminal belongs to. That is, the MCC and the MNC included in the IMSI number of the SIM card are consistent with the MCC and MNC on the HPLMN.

In particular, the VPLMN is abbreviation of visited PLMN, which is the PLMN visited by the subscriber of the communication terminal. The VPLMN and the MCC and MNC in IMSI of the SIM card are not exactly the same.

In particular, the UPLMN is abbreviation of User Controlled PLMN, which is a parameter stored in the SIM card and is related to the selection of the PLMN, the UPLMN is a selected PLMN selected by the communication terminal when the subscriber manually selects a network.

In particular, the OPLMN is abbreviation of Operator Controlled PLMN, which is a parameter related to selection of PLMN and is stored in the SIM card, when the operator burns the SIM card, the operator writes a PLMN which has signed a roaming agreement with the operator is written into the SIM card as OPLMN, so that the OPLMN is used as a suggestion for selecting network during roaming.

In particular, the FPLMN is abbreviation of Forbidden Public PLMN, which is a PLMN that is prohibited from being accessed, generally, after the communication terminal 1 attempts to access one PLMN and is refused to access the PLMN, the communication terminal 1 can add this PLMN in the list.

In particular, HPPLMN search timer is abbreviated as a Timer of Higher Priority PLMN for searching network, when the network has a low priority, a high priority network search process is triggered to achieve registration of a higher priority network after the HPPLMN search timer is expired.

In a step of S103, dynamically configuring various parameters in the SIM card to be registered according to the various optimal parameters.

In this embodiment of the present disclosure, the various parameters in the SIM card to be registered are dynamically configured and modified according to various optimal parameters obtained by the server 2, thus, when the communication terminal 1 lies in different positions, the parameters in the SIM card to be registered which are determined to be configured by the server 2 are also different, these parameters are optimal parameters, thus, the communication terminal 1 realizes fast search and registration of optimal network according to the configured optimal parameters.

In a step of S104, sending the dynamically configured SIM card to be registered to the communication terminal 1 in order that the communication terminal 1 searches and registers a network for the SIM card to be registered corresponding according to various configured parameters.

The server 2 sends the dynamically configured SIM card to be registered to the communication terminal 1, in this situation, the communication terminal 1 searches and registers a network for the SIM card to be registered according to the various configured parameters after receiving the SIM card to be registered, so that a network standard corresponding to the optimal parameters can be quickly registered through a carrier's system with which the optimal parameters are associated.

According to the network search and registration method provided by this embodiment of the present disclosure, the server 2 determines various optimal parameters corresponding to the SIM card to be registered by obtaining the current location of the communication terminal 1, and dynamically configures the various optimal parameters into the SIM card to be registered so as to allow the parameters in the SIM card to be registered to be modified, and sends the SIM card to be registered to the communication terminal 1, so that the communication terminal 1 is enabled to quickly search and register the network for the SIM card to be registered according to the parameters with modified configurations; however, due to the fact that the various parameters in the SIM card to be registered are irrevocably written by the carrier and cannot be modified in the prior art, the problems including poor registered network, longer registration time and expensive tariff of registered network are caused; the technical problem in the prior art that a fast search and registration of optimal network cannot be realized has been solved in the present disclosure.

Embodiment Two

Figure 3:
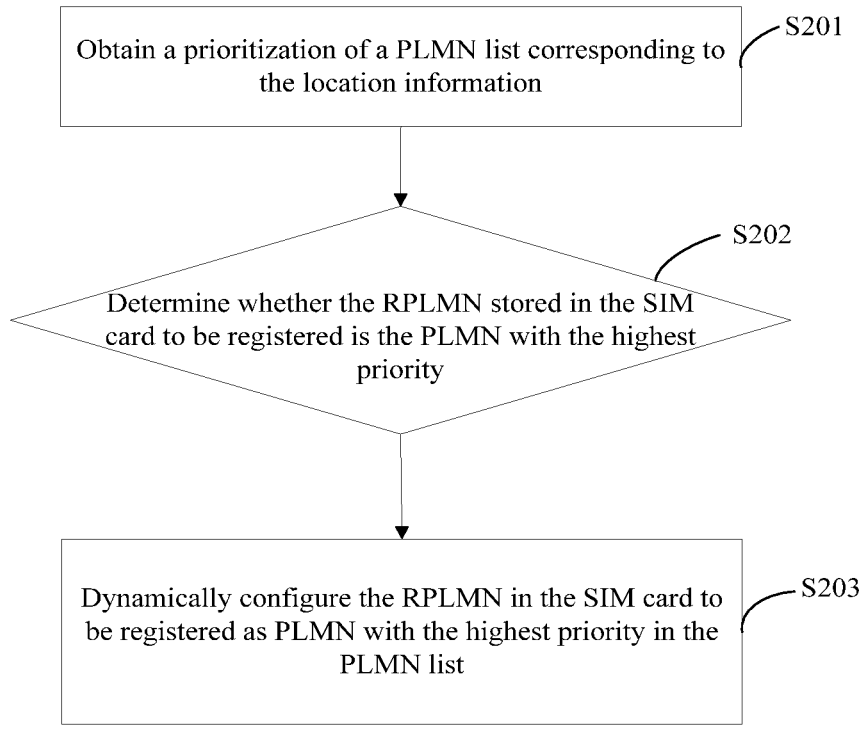
FIG. 3 illustrates an implementation flowchart of another network search and configuration method according to embodiment two of the present disclosure.

FIG. 3 illustrates an implementation flowchart of a network search and configuration method according to one embodiment of the present disclosure. For the convenience of description, the part associated with the embodiment of the present disclosure is illustrated merely. The network search and configuration method differs from the network search and configuration method shown in FIG. 2 in that the various parameters include a RPLMN; and the step of dynamically configuring various parameters in the SIM card to be registered according to the various optimal parameters includes:

in a step of S201, obtaining a prioritization of a PLMN list corresponding to the location information.

In this embodiment of the present disclosure, the aforesaid step of obtaining the prioritization of the PLMN list corresponding to the location information can be implemented with reference to the following steps:

(1) obtaining network signal strengths of multiple PLMNs, time spent on searching and registering networks of the multiple PLMNs, and user experiences fed back by the searched and registered PLMN, which are historically reported by multiple communication terminals 1 according to the location information;

(2) obtaining tariff conditions of the multiple PLMNs in the PLMN list corresponding to the location information;

(3) determining the prioritization of the multiple PLMNs in the PLMN list according to the network signal strengths, the time spent on searching and registering network, the user experiences, and the tariff conditions.

Wherein when each communication terminal 1 searches and registers a network, the communication terminal 1 may report the network signal strengths of the multiple PLMNs detected at the position where the communication terminal 1 is located to the server 2, and report the time spent on searching and registering network of each registered PLMN to the server 2, the communication terminal 1 may also report the user experiences of the successfully registered PLMN as fed back by the user to the server 2. Meanwhile, the server 2 may obtain the tariff conditions corresponding to the multiple PLMNs.

In this situation, the server 2 determines the prioritization of each PLMN according to the obtained network signal strengths, the network search registration time, the user experiences and the tariff conditions, in particular, the server 2 determines score values of the multiple PLMNs according to the currently obtained various information and the corresponding weights by setting different weights, so that the prioritization can be analyzed comprehensively according to the score values of the multiple PLMNs.

Furthermore, the communication terminal 1 may also send information including usage rate (i.e., upload rate and download rate) used by the registered network, response duration to the server 2, such that the server 2 can determine prioritization according to the information, either.

Furthermore, it is worth noting that the server 2 receives the information reported by various communication terminals 1, and can dynamically adjust prioritization of the PLMNs according to the currently reported information when the network signal strengths reported by the various communication terminals 1 located at the geographic position are weak, so that the server 2 is enabled to determine the various optimal parameters according to the currently determined prioritization.

In a step of S202, determining whether the RPLMN stored in the SIM card to be registered is the PLMN with the highest priority in the PLMN list.

In this embodiment of the present disclosure, the communication terminal 1 uses the SIM card to be registered to search and register a network, and a PLMN (i.e., RPLMN) which is registered before the last shutdown or off-line can be recorded in the SIM card to be registered, in this situation, the communication terminal 1 can start to search and register a network when the user restarts the communication terminal 1 or travels through a channel with poor signal coverage, or when the user clicks the virtual SIM card, in this situation, the communication terminal 1 may search and register a communication network of RPLMN firstly according to the prioritization of PLMN, when the network signal quality of the communication network corresponding to the RPLMN is not good, the communication network of RPLMN is continuously searched and registered for the SIM card to be registered, so that a registration of optimal network cannot be realized; for example, a roaming card may register China Unicom 3G (The Third Generation Telecommunications) network and may also register China Mobile 2G (The second Generation Telecommunications) network in China, in this situation, it is obvious that China Unicom 3G network is much better than China Mobile 2G network. However, when some communication terminal 1 cannot register China Unicom 3G network but successfully registers China Mobile 2G network, the RPLMN in the SIM card to be registered becomes 46000 corresponding to China Mobile, thus, when a network is registered for the SIM card to be registered at the next time, the network which is registered according to the RPLMN with the highest priority is still the network corresponding to China Mobile 2G network with the PLMN of 46000, a poor user experience is caused accordingly.

Therefore, in this embodiment, the server 1 determines whether the RPLMN stored in the SIM card to be registered is the PLMN with the highest priority in the PLMN list;

When the RPLMN stored in the SIM card to be registered is not determined as the PLMN with the highest priority in the PLMN list, step S203 is executed; When the RPLMN stored in the SIM card to be registered is determined as the PLMN with the highest priority in the PLMN list, the RPLMN stored in the SIM card to be registered is not modified.

In a step of S203, dynamically configuring the RPLMN in the SIM card to be registered as the PLMN with the highest priority in the PLMN list.

In this embodiment of the present disclosure, when the RPLMN stored in the SIM card to be registered is not determined as the PLMN with the highest priority in the PLMN list, the RPLMN in the SIM card to be registered is dynamically determined as the PLMN with the highest priority in the PLMN list, in this situation, due to the fact that the RPLMN is the RPLMN with the highest priority in the PLMN list, moreover, when the communication terminal activates a SIM card, a network is searched and registered preferentially according to the PLMN with the highest priority, thus, the communication network of the PLMN with the highest priority can be registered preferentially every time when the communication terminal searches and registers a network.

According to the network search and configuration method provided by this embodiment of the present disclosure, when the RPLMN stored in the SIM card to be registered is not the PLMN with the highest priority in the PLMN list, the prioritization in the PLMN list corresponding to the location information is obtained and the PLMN is dynamically configured as the PLMN with the highest priority in the PLMN list, so that the RPLMN can be registered preferentially when searching and registering a network for the SIM card to be registered, the registration of the optimal network is realized, and a problem that a poor network is searched and registered due to poor network communication quality in the RPLMN in the prior art is solved.

Embodiment Three

Figure 4:
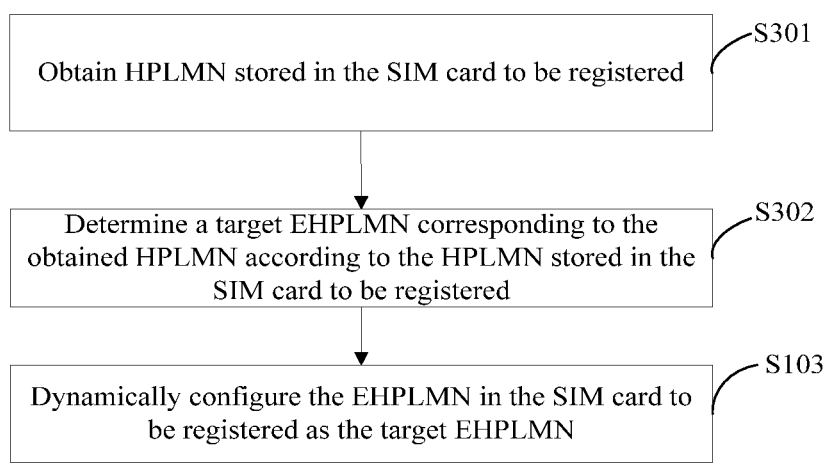
FIG. 4 illustrates an implementation flowchart of another network search and configuration method according to embodiment three of the present disclosure.

FIG. 4 illustrates an implementation flowchart of a network search and configuration method according to one embodiment of the present disclosure. For the convenience of description, the part associated with this embodiment of the present disclosure is merely illustrated. The network search and configuration method differs from the network search and configuration method shown in FIG. 2 in that the various parameters include EHPLMN and HPLMN; the step of dynamically configuring various parameters in the SIM card to be registered according to the various optimal parameters includes:

in a step of S301, obtaining the HPLMN stored in the SIM card to be registered.

In this embodiment of the present disclosure, it is worth noting that, according to the 3GPP TS 31.102 protocol, prioritization of network search and registration is RPLMN, EHPLMN, HPLMN sequentially, in this situation, when the RPLMN is not configured, a network is searched and registered correspondingly according to the EHPLMN, however, EHPLMN in not configured in some SIM cards in the prior art, thus, network is searched and registered according to HPLMN, however, there is a condition that some HPLMNs don't correspond to a communication network, for example, the HPLMN of the Internet of Things card of China Mobile is 46004, in this situation, since the EHPLMN is not configured and the RPLMN is not configured, therefore, when a network corresponding to the HPLMN is searched, the network of China Mobile 46004 is searched, however, since the communication network corresponding to China Mobile 46004 doesn't exist, time spent on the first time of network search is wasted, and the time of network search and registration is prolonged accordingly.

In this embodiment of the present disclosure, the server 2 first obtains the HPLMN stored in the SIM card to be registered.

In a step of S302, determining a target EHPLMN corresponding to the HPLMN stored in the SIM card to be registered.

In this embodiment of the present disclosure, the server 2 determines a target EHPLMN corresponding to the HPLMN stored in the SIM card to be registered, for example, when the HPLMN is 64004, the corresponding target EHPLMN can be determined as 64000, in this situation, the EHPLMN can be configured to be corresponding to the HPLMN for the SIM card of Chinese Mobile correspondingly.

In a step of S303, dynamically configuring the EHPLMN in the SIM card to be registered as the target EHPLMN.

In this embodiment of the present disclosure, the EHPLMN in the SIM card to be registered is dynamically configured as the target EHPLMN according to the determined EHPLMN, for example, when the EHPLMN is not configured, the corresponding target EHPLMN is determined as 46000 according to the obtained HPLMN 46004, the target EHPLMN is configured into the EHPLMN of the SIM card to be registered correspondingly, in this way, during searching and registering of the network, when the RPLMN is not configured, network can be searched and registered correspondingly according to the correct EHPLMN, a problem that the HPLMN which is a non-existent communication network is searched and registered because that the HPLMN is not configured, so that a waste of time spent on the first time of network search and registration is caused is avoided, and time spent on the network search and registration can be shortened.

In the network search and configuration method provided by this embodiment of the present disclosure, the corresponding EHPLMN is determined according to the HPLMN, so that the EHPLMN in the SIM card to be registered is correctly configured, the problem that the HPLMN which is a non-existent communication network is searched and registered because that the EHPLMN is not configured is avoided, so that a waste of time spent on the first time of network search and registration is caused is avoided, and network search and registration can be quickly performed.

Embodiment Four

Figure 5:
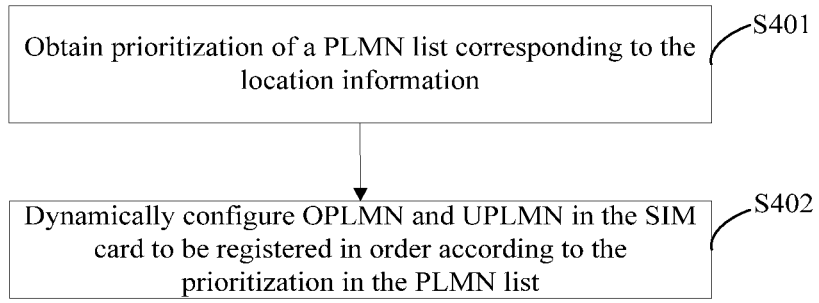
FIG. 5 illustrates an implementation flowchart of another network search and configuration method according to embodiment four of the present disclosure.

FIG. 5 illustrates an implementation flowchart of a network search and configuration method according to one embodiment of the present disclosure. For the convenience of description, the part associated with the embodiment of the present disclosure is merely illustrated. The network search and configuration method differs from the network search and configuration method shown in FIG. 2 in that the various parameters include OPLMN and UPLMN; the steps of dynamically configuring various parameters in the SIM card to be registered according to the various optimal parameters includes:

in a step of S401, obtaining a prioritization of a PLMN list corresponding to the location information.

In this embodiment of the present disclosure, the aforesaid obtaining a prioritization of a PLMN list corresponding to the location information can be implemented by executing the following steps:

(1) obtaining network signal strengths of multiple PLMNs, the time spent on searching and registering network of the multiple PLMNs, and user experiences fed back by the searched and registered PLMN, which are historically reported by various communication terminals 1 according to the location information;

(2) obtaining tariff conditions of the multiple PLMNs in the PLMN list corresponding to the location information;

(3) determining the prioritization of the multiple PLMNs in the PLMN list according to the network signal strengths, the time spent on searching and registering network, the user experiences, the tariff conditions.

In a step of S402, dynamically configuring the OPLMN and the UPLMN in the SIM card to be registered according to the prioritization in the PLMN list.

In this embodiment of the present disclosure, when a user uses a communication terminal 1 to perform a roaming communication at a roaming place, in this situation, the communication terminal 1 first uses the RPLMN to search and register a network, when network search and registration is failed, network is searched and registered according to the prioritization of the OPLMN and the UPLMN in prioritization of PLMN, due to the fact that the parameters in the SIM card is irrevocably written and cannot be modified in the prior art, network can only be searched and registered according to the previous prioritization the OPLMN and the UPLMN, however, in actual use, tariff conditions and network communication qualities of different communication networks are variable, when the preset highest priority OPLMN with the highest priority is a PLMN that is expensive in tariff and poor in network communication quality, user experience is not good enough, for this reason, the server 2 dynamically configures OPLMN and UPLMN in the SIM card to be registered according to the prioritization of the PLMN list corresponding to the obtained location information, so that the communication terminal 1 can perform network search and registration in sequence according to prioritization of the OPLMN and the UPLMN when user uses the communication terminal 1 to perform roaming communication at the roaming place, the prioritization of the OPLMN and the UPLMN obtained each time when network is searched and registered are optimal and the newest, so that a fast registration of optimal network can be realized, and a problem of registration of network with poorer communication quality or longer registration time caused due to unmodified parameters in the SIM card in the prior art is avoided.

According to the network search and configuration method provided by this embodiment of the present disclosure, the prioritization of the PLMN list corresponding to the location information is obtained, and the prioritization of the PLMN list is dynamically configured in the OPLMN and the UPLMN in the SIM card to be registered, a problem that the registered network has poorer communication quality or has longer registration time caused because that the parameters cannot be modified in the existing SIM card during roaming is solved, so that searching and registering optimal network can be quickly performed.

Embodiment Five

Figure 6:
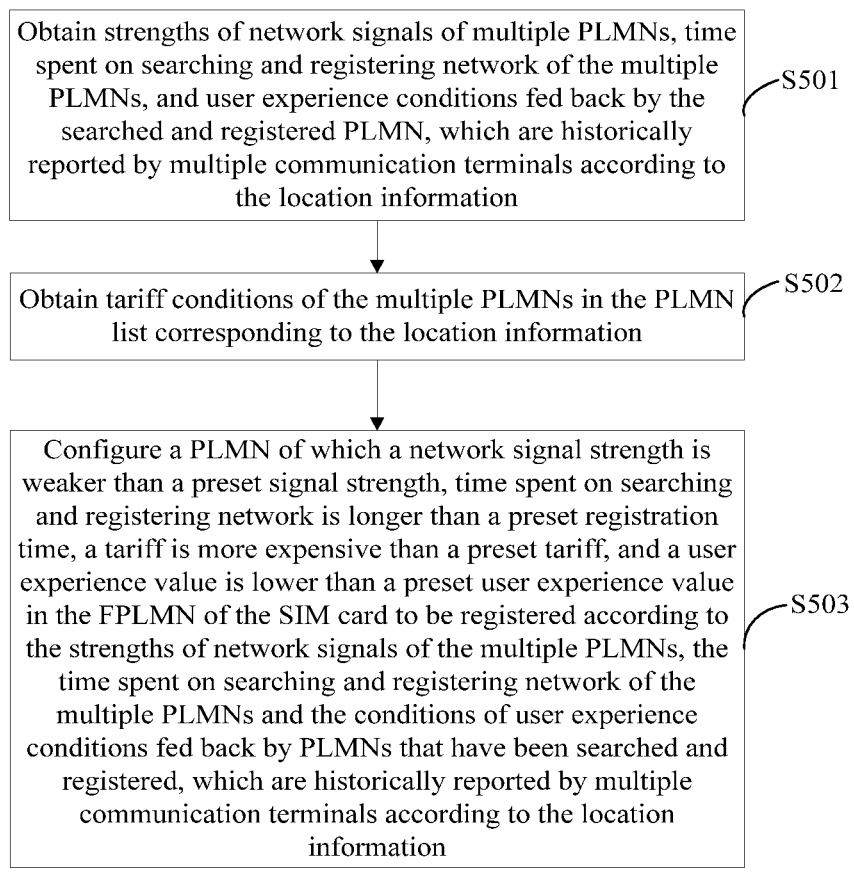
FIG. 6 illustrates an implementation flowchart of another network search and configuration method according to embodiment five of the present disclosure.

FIG. 6 illustrates an implementation flowchart of a network search and configuration method according to one embodiment of the present disclosure. For the convenience of description, a part associated with the embodiment of the present disclosure is merely illustrated. The network search and configuration method differs from the network search and configuration method shown in FIG. 2 in that the various parameters comprise FPLMN; the step of dynamically configuring various parameters in the SIM card to be registered according to the various optimal parameters includes:

In a step of S501, obtaining network signal strengths of multiple PLMNs, time spent on searching and registering network of the multiple PLMNs, and user experiences fed back by searched and registered PLMN, which are historically reported by various communication terminals 1 according to the location information.

In a step of S502, obtaining tariff conditions of the multiple PLMNs in the PLMN list corresponding to the location information.

In a step of S503, configuring a PLMN of which a network signal strength is weaker than a preset signal strength, time spent on searching and registering network is longer than a preset registration time, a tariff is higher than a preset tariff, and user experience value is lower than a preset user experience value into the FPLMN of the SIM card to be registered, according to the network signal strengths of the multiple PLMNs, the network signal strength of the multiple PLMNs, and the user experiences fed back by the searched and registered PLMN.

In this embodiment of the present disclosure, the FPLMN is a PLMN which is prohibited from being accessed, that is, the communication terminal 1 can skip PLMN communication network in the FPLMN when searching and registering a network, so that time spent on network searching can be avoided, wherein the existing FPLMN is a PLMN which generally includes a PLMN preset by network carrier and a PLMN refused by the communication network in the network search and registration process, wherein the reason why the PLMN is refused by the communication network is represented by the value of 11.

The communication network that can be registered currently is usually not added into the FPLMN, however, when the existing roaming network is searched and registered, if the tariff is expensive, the user experience condition is terrible, the network which has weak network signal strength is still searched and registered; wherein, for example, in a roaming state, assuming that the SIM card can register China Mobile and China Unicom at the same time, however, the tariff of China Unicom is much higher than the tariff of China Mobile, in this situation, it is completely unnecessary to register the network of China Unicom, however, in the current process, China Unicom would not be added into the FPLMN, as a consequence, when the communication terminal 1 registers the communication network of China Unicom, the user is prone to pay expensive roaming fee. Therefore, the communication network which needn't to be registered, is high in tariff, is bad in user experience and is weak in network signal strength is added in the FPLMN, such that the communication terminal 1 can skip the process of registrations of the networks in the FPLMN, and the user is avoided from paying high cost or getting terrible user experience.

Meanwhile, in the process of searching and registering network for the existing SIM card, there are some abnormal communication networks, although network search and registration is refused, and the reason for refuse of the network search and registration is not the value of 11, the attempt of continuing to search and register network would never be successful once registration of the network is refused, however, the attempt to search and register network is continually performed in the current network registration process, thus, communication network cannot be registered for a long period of time, and the user experience is not good; in this situation, the PLMN which has a network search and registration time longer than the preset time and is refused by a network due to other refuse value (e.g., 13) is added into the FPLMN, so that time spent on network search and registration can be saved, and faster network search and registration can be realized.

According to the network search and configuration method provided by this embodiment of the present disclosure, the network signal strengths of the multiple PLMNs in the PLMN list corresponding to the location information, the network search and registration time, and the tariff conditions are obtained, and are further compared with preset values, the PLMN which has a network signal strength weaker than the preset signal strength, has a network search registration time longer than the preset registration time, has a tariff condition higher than the preset tariff, and has a user experience value lower than the preset user experience value is determined and is further configured into the FPLMN of the SIM card to be registered, so that the registration of the communication networks in the FPLMN can be skipped when a network is searched and registered by the communication terminal 1, the user can be avoided from paying expensive cost and getting bad experiences, and a more preferable network can be registered fast.

In other embodiment of the present disclosure, the parameters may also include HPPLMN search timer, in this situation, the server 2 dynamically configures the HPPLMN search timer in the SIM card to be registered according to the location information. According to the 3GPP protocol specification, a PLMN with higher priority needs to be searched after the HPPLMN search timer expires. For example, when the communication terminal 1 is in a roaming state, the priority of China Mobile is the highest, however, the SIM card currently registers the network of China Unicom with low priority, when the HPPLMN search timer expires, it needs to search and attempt to register China Mobile, which is a logical processing. However, assuming that it is now in India, and there are many network carriers in India, different areas are covered by different carriers, it is obvious that a return network with high priority is unnecessary at this time because that a network with a higher priority is not prone to be searched through network search and registration, those communication networks which have higher priority are not covered in this area at all. If network search and registration continues to be performed according to the existing communication rules, a waste of resource is caused. Therefore, there is sometimes a need for a return network with high priority in some place, while there is sometimes no need for a return network with high priority. However, in the existing SIM card, the HPMPLMN search timer is irrevocably written as a fixed value and cannot be modified; in the embodiment of the present disclosure, the corresponding HPPLMN search timer value is obtained according to the location information, and the corresponding HPPLMN search timer value is configured into the HPMPLMN search timer of the SIM card to be registered, in this situation, the HPPLMN search timer value is correspondingly set at the place where return network with high priority is needed, the HPPLMN search timer value is correspondingly set as 00 when there is no need for return network with high priority, so that the SIM card to be registered performs return network with high priority correspondingly or no longer initiate the operation of return network with high priority when the HPPLMN search timer is expired.

It needs to be noted that, in other embodiment of the present disclosure, the network search and configuration method may also be the combination of some or all of the method embodiments mentioned above. Thus, a fast search and registration of optimal network for the SIM card to be registered can be realized.

Embodiment Six

Figure 7:
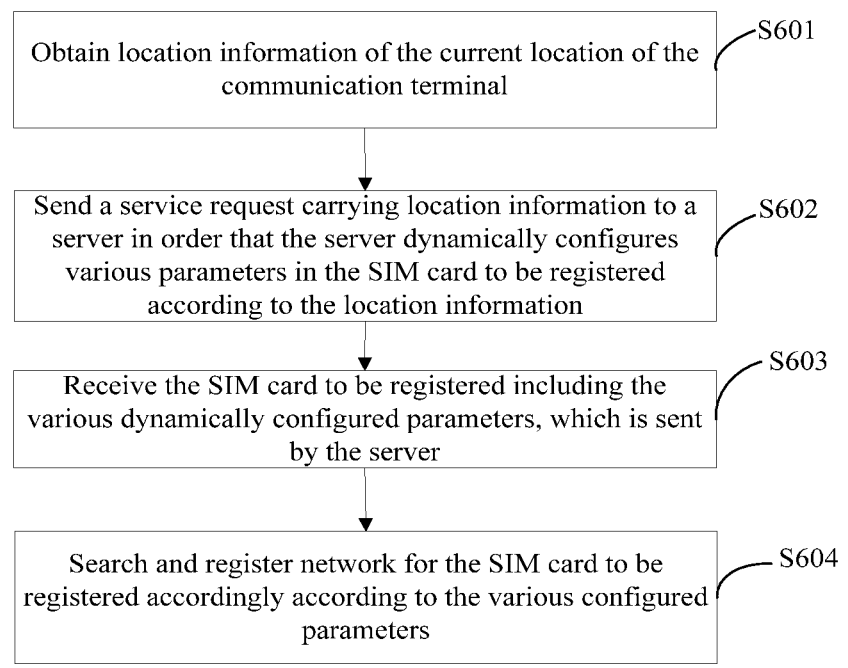
FIG. 7 illustrates an implementation flowchart of another network search and configuration method according to embodiment six of the present disclosure.

FIG. 7 illustrates an implementation flowchart of a network search and registration method according to one embodiment of the present disclosure. For the convenience of description, the part associated with this embodiment of the present disclosure is merely illustrated. The network search and registration method is applied to a communication terminal 1 and includes:

In a step of S601, obtaining location information of the current location of the communication terminal 1.

In this embodiment of the present disclosure, the communication terminal 1 may attempt to determine its own location or location information associated with its own location. The location of the communication terminal 1 can be determined by any one of multiple approaches. As one possibility, the communication terminal 1 may determine its own location according to the location information based on GNSS (Global Navigation Satellite System), terrestrial broadcast information (e.g., FM radio broadcast, television broadcast, etc.), Wi-Fi based information, information obtained through Bluetooth communications, and/or any other information.

In a step of S602, sending a service request carrying the location information to a server 2 in order that the server 2 can dynamically configure various parameters in the SIM card to be registered according to the location information.

In this embodiment of the present disclosure, a service request carrying location information is determined according to the obtained location information, and the service request is sent to a server 2. Wherein the service request further includes user identification information, service type information requested by the user, and the like. Wherein the user identification information is an identification name or an identification number, and is used for uniquely identifying one single communication terminal 1, thus, after the communication terminal 1 sends the service request to the server 2, the server 2 is enabled to send a message to a corresponding communication terminal 1 so as to response to the communication terminal 1 upon the service request.

In this embodiment of the present disclosure, when the communication terminal 1 needs to initiate network search and registration to realize searching and registering network for the SIM card to be registered due to various reasons such as restarting or passing through a tunnel with poor signal coverage, the communication terminal 1 will obtain the current location information before network search and registration, and send a service request carrying the location information to the server 2 by means of such as Wi-Fi or the like.

It should be noted that, the SIM card to be registered for network search and registration in this embodiment of the present disclosure is specifically a virtual SIM card, and the virtual SIM card is a SIM card which is not previously inserted or arranged in the communication terminal 1 but needs to be downloaded from the server 2. Due to the fact that the virtual SIM card is a SIM card which is a complete software card corresponding to the physical SIM card, various parameters in the virtual SIM card can be set, however, parameters in the physical SIM card are irrevocable and cannot be modified.

In a step of S603, receiving the SIM card to be registered in which the various parameters have been dynamically configured, which is sent by the server 2.

In this embodiment of the present disclosure, after the communication terminal 1 sends the service request carrying location information to the server 2, the server 2 can obtain various optimal parameters corresponding to the location information correspondingly according to the location information in the obtained service request, and correspondingly dynamically configure the various parameters in the SIM card to be registered that needs to be sent to the communication terminal 1 as the obtained optimal parameters, so that the communication terminal 1 is enabled to search and register a network for the SIM card to be registered according to various optimal parameters.

The SIM card data that can be written in the virtual SIM card includes but is not limited to a phone number, an ICCID (Integrated Circuit Card Identification Code), an IMSI (International Mobile Subscriber Identity), an authentication key, a short message center, a PLMN (Public Land Mobile Network), or a combination thereof.

In this embodiment, a corresponding network search and registration method is disclosed, thus, the parameters that can be modified are mainly PLMN, in particular, in this embodiment of the present disclosure, the various parameters mainly include one or more of RPLMN, EHPLMN, HPLMN, VPLMN, UPLMN, OPLMN, FPLMN, HPPLMN search timer. The server 2 dynamically configures one or more of the RPLMN, EHPLMN, HPLMN, VPLMN, UPLMN, OPLMN, FPLMN, HPPLMN and HPPLMN search timer according to the obtained location information.

In a step of S604, searching and registering network for the SIM card to be registered according to various configured parameters correspondingly.

In this embodiment of the present disclosure, the allocated SIM card to be registered is installed, and searching and registering network for the SIM card to be registered are correspondingly performed according to various configured parameters after the SIM card to be registered is received by the communication terminal 1, in this situation, the various parameters in the SIM card to be registered are all configured as optimal parameters, so that fast searching and registering the optimal network can be realized.

In the network search and registration method provided by the embodiment of the present disclosure, the location information of the current location of the communication terminal 1 is sent to the server 2, so that the server 2 is enabled to dynamically configure the various parameters in the SIM card to be registered corresponding to the location information, and response to the communication terminal 1; in this situation, the communication terminal 1 searches and registers network for the SIM card to be registered sent by the server 2 correspondingly; due to the fact that the dynamically configured various parameters in the SIM card to be registered are the optimal parameter, a fast registration of the optimal network can be performed according to various optimal parameters. However, in the prior art, due to the fact that the parameters in the SIM card to be registered is irrevocably written by network carrier and cannot be modified, a problem of poor registration network, longer registration time, more expensive tariff of registered network is caused when the SIM card to be registered is searched and registered by the communication terminal 1 according to the parameters.

Embodiment Seven

Figure 8:
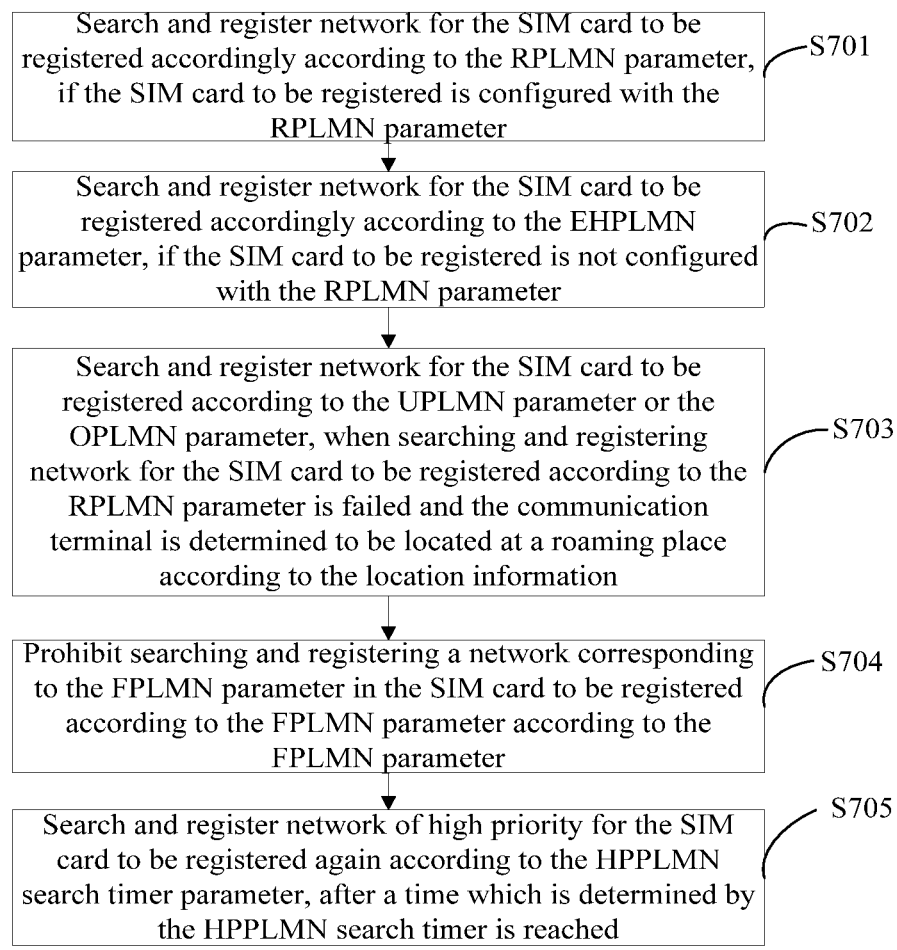
FIG. 8 illustrates an implementation flowchart of another network search and configuration method according to embodiment seven of the present disclosure.

FIG. 8 illustrates an implementation flowchart of a network search and registration method according to one embodiment of the present disclosure. For the convenience of description, the part associated with this embodiment of the present disclosure is merely illustrated. The network search and registration method differs from the network search registration method shown in FIG. 2 in that the various parameters further include RPLMN, EHPLMN, HPLMN, UPLMN, OPLMN, FPLMN, HPPLMN search timer, and the step of searching and registering network for the SIM card to be registered according to various configured parameters includes:

In a step of S701, searching and registering network correspondingly for the SIM card to be registered according to the RPLMN parameter, when the RPLMN parameter is configured in the SIM card to be registered.

In this embodiment of the present disclosure, the communication terminal 1 obtains various parameters in the SIM card to be registered after the SIM card to be registered sent by the server 2 is obtained, wherein the various parameters include but are not limited to one or more of RPLMN, EHPLMN, HPLMN, VPLMN, UPLMN, OPLMN, FPLMN, HPPLMN search timer.

In this situation, since the prioritization is sequentially RPLMN, EHPLMN, HPLMN, VPLMN, UPLMN, OPLMN and FPLMN, the RPLMN in the SIM card to be registered is first obtained by the communication terminal 1, at this time, whether the RPLMN parameter is configured in the SIM card to be registered is determined, when the RPLMN parameter is configured in the SIM card to be registered, network search and registration is performed according to the RPLMN parameter.

It needs to be noted that RPLMN is a PLMN dynamically configured by the server 2 according to the location information, the RPLMN is not a PLMN registered prior to the last shutdown or off-line of the communication terminal 1, therefore, for example, a roaming SIM card can be registered with China Unicom 3G (Third Generation Telecommunications), and may also be registered with China Mobile 2G (Second Generation Telecommunications), at this time, it is obvious that the China Unicom 3G network is much better than China Mobile 2G network. However, when a communication terminal 1 fails to register China Unicom 3G network but successfully registers China Mobile 2G network, at this time, the RPLMN in the existing SIM card to be registered becomes 46000 corresponding to China Mobile, thus, at the next time when the SIM card is activated, the network which is registered according to the RPLMN with the highest priority is still the China Mobile 2G network which corresponds to the PLMN of 46000, so that the user experience is not good enough. However, the server 2 in the present disclosure determines that China Unicom 3G network is much better than China Mobile 2G network according to the location information, and can dynamically configure China Mobile 2G in the RPLMN stored in the SIM card to be registered as China Unicom 3G through modification, so that the communication terminal 1 can preferentially search and register network according to China Unicom 3G network when searching and registering a network for the SIM card to be registered, thus, a fast search and registration of the optimal network can be realized.

In a step of S702, searching and registering network corresponding for the SIM card to be registered according to the EHPLMN parameter when the RPLMN parameter is not configured in the SIM card to be registered.

Wherein, in this embodiment of the present disclosure, when the RPLMN parameter is not configured in the SIM card to be registered, EHPLMN and EHPLMN are searched and registered in sequence according to the prioritization, wherein it needs to be noted that, EHPLMN which is solely corresponding to the HPLMN exists in the SIM card to be registered, thus, the server 2 can determine the corresponding EHPLMN according to the HPLMN in the SIM card to be registered, the server 2 is enabled to dynamically configure the target EHPLMN corresponding to the HPLMN into the EHPLMN of the SIM card to be registered when the EHPLMN in the SIM card to be registered is not configured, the communication terminal 1 is enabled to search and register network for the SIM card to be registered correspondingly according to the EHPLMN when the RPLMN is not configured.

However, for example, HPLMN of the Internet of Things card of China Mobile is 46004, at this time, due to the fact that the EHPLMN and the RPLMN are not configured, thus, when network is searched for HPLMN, network is searched aiming at HPLMN of 46004, however, there is no communication network corresponding to 46004, time spent on searching network for the first time is wasted, and the time spent on searching and registering network is prolonged. According to this embodiment of the present disclosure, EHPLMN of the SIM card to be registered is dynamically configured according to the HPLMN, so that the server 2 can correctly configure the EHPLMN in the SIM card to be registered no matter whether the EHPLMN is configured in the SIM card to be registered, thus, the communication terminal 1 can search and register network for the SIM card to be registered according to the EHPLMN.

In a step of S703, searching and registering network for the SIM card to be registered correspondingly according to the UPLMN parameter or the OPLMN parameter, when searching and registering network for the SIM card to be registered according to the RPLMN parameter is failed and the communication terminal 1 is determined to be located at a roaming place according to the location information.

Wherein, when searching and registering network for the SIM card to be registered according to the RPLMN parameter is failed and the communication terminal 1 is determined to be located at a roaming place according to the location information, in this situation, the communication terminal 1 cannot perform network search and registration according to the EHPLMN and the HPLMN, instead, the communication terminal 1 performs network search and registration correspondingly according to the UPLMN parameter or the OPLMN parameter; wherein the server 2 determines the prioritization of the corresponding PLMN list according to the location information, and dynamically configures the corresponding the UPLMN parameter or the OPLMN parameter according to the prioritization, thus, both the UPLMN parameter and the PLMN parameter are optimal parameter.

The server 2 determines the prioritization of the corresponding PLMN list according to the location information can be implemented by executing the following steps:
(1) obtaining network signal strengths of multiple PLMNs, the time spent on searching and registering network of the multiple PLMNs, and the user experiences fed back by the searched and registered PLMN, which are historically reported by various communication terminals 1 according to the location information;
(2) obtaining tariff conditions of the multiple PLMNs in the PLMN list corresponding to the location information;
(3) determining the prioritization of the multiple PLMNs in the PLMN list according to the network signal strengths, the time spent on searching and registering network, the user experiences, the tariff conditions.

Due to the fact that the parameters in the existing SIM card is irrevocably written and cannot be modified, such that network can only be searched and registered according to the previous prioritization the OPLMN and the UPLMN, however, in actual use, the tariff conditions and the network communication qualities of different communication networks are variable, when the preset OPLMN with the highest priority is a PLMN that is expensive in tariff and poor in network communication quality, user experience is not good enough, for this reason, the server 2 dynamically configures OPLMN and UPLMN in the SIM card to be registered according to prioritization of the PLMN list corresponding to the obtained location information, so that the communication terminal 1 can perform network search and registration in sequence according to prioritization of the OPLMN and the UPLMN when the user uses the communication terminal 1 to perform roaming communication at the roaming place, the prioritization of the OPLMN and the UPLMN which are obtained each time when network is searched and registered are optimal and the newest, so that a fast registration of optimal network can be realized, and a problem of registration of network with poorer communication quality or longer registration time caused because that parameters are irrevocable in the existing SIM card is avoided.

In a step of S704, prohibiting searching and registering the network corresponding to the FPLMN parameter in the SIM card to be registered according to the FPLMN parameter.

In this embodiment of the present disclosure, the various parameters of the FPLMN further includes FPLMN, wherein the FPLMN is the PLMN which is prohibited from being accessed, that is, the communication terminal 1 can skip the PLMN communication network in the FPLMN when network search and registration are performed, so that a waste of time spent on network searching is avoided. The communication terminal 1 skips search and registration of FPLMN according to the FPLMN configured in the SIM card to be registered.

wherein the existing FPLMN is a PLMN which generally includes a PLMN preset by network carrier and a PLMN refused by the communication network in network searching and registration process, wherein the reason why the PLMN is refused by the communication network is represented by the value of 11. The communication network that can be registered currently is usually not added into the FPLMN, however, when the existing roaming network is searched and registered, if the tariff condition is expensive, the user experience condition is terrible, a network which has very weak network signal strength continues to be searched and registered; wherein, for example, in a roaming state of the communication terminal 1, assuming that the SIM card can register China Mobile and China Unicom at the same time, however, the tariff of China Unicom is more expensive than the tariff of China Mobile, in this situation, it is absolutely unnecessary to register China Unicom network, however, in the current process, China Unicom would not be added into the FPLMN, as a consequence, when the communication terminal 1 registers the communication network of China Unicom, the user is prone to pay very expensive roaming fee. Therefore, the communication network which needn't to be registered, is high in tariff, is bad in user experience and is weak in network signal strength is added in the FPLMN, in this way, the communication terminal 1 can skip the process of registrations of the networks in the FPLMN, and the user is avoided from paying high cost or getting terrible user experience.

Meanwhile, in the process of searching and registering a network for the existing SIM card, there are some abnormal communication networks, although network search and registration is refused, and the reason for refuse of the network search and registration is not the value of 11, the attempt of continuing to search and register network would never be successful once registration of the network is refused, however, the attempt to search and register network is continually performed in the current network registration process, thus, communication network cannot be registered for a long period of time, so that the user experience is bad; in this situation, the PLMN which has a network search and registration time longer than the preset time, and is refused by the network due to other refuse value (e.g., 13) is added into the FPLMN, such that time spent on network search and registration can be saved, and faster network search and registration can be realized.

In a step of S705, searching and registering network of high priority for the SIM card to be registered again according to parameters of HPPLMN search timer, after the time determined by the HPPLMN search timer is reached.

Wherein the communication terminal 1 searches and registers network with high priority again for the SIM card to be registered after the HPPLMN search timer reaches the time determined by the HPPLMN search timer. However, the existing HPPLMN search timer is irrevocably written and is invariable, it is a value that cannot be modified, in this situation, when a high-priority return network is not needed, a high-priority return network is performed when the time set by the HPMPLMN search timer parameter value is reached, and a waste of resource is caused. However, the server 2 determines a dynamically configured HPPLMN search timer parameter value according to the location information, and performs a corresponding high-priority return network according to the HPPLMN search timer parameter value, in this situation, the value of HPPD search timer can be set as 00 accordingly when high-priority return network is not needed, so that the problems of useless network searching and a waste of resource are avoided.

Embodiment Eight

Figure 9:
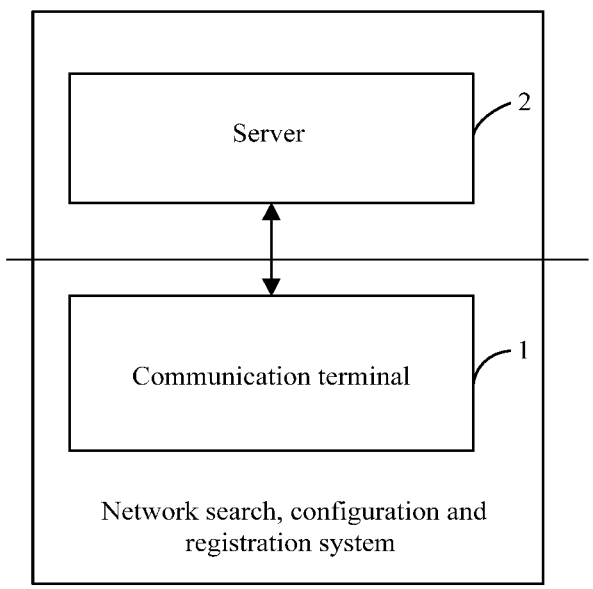
FIG. 9 illustrates a schematic block diagram of a network search, configuration, and registration system according to embodiment eight of the present disclosure.

FIG. 9 illustrates a schematic structure of a system for network search and configuration, and registration, for the convenience of description, the part associated with this embodiment of the present disclosure is merely illustrated.

As shown in FIG. 9, this system includes a communication terminal 1 and a server 2 being in communication with the communication terminal 1;

wherein the server 2 is configured to:
receive a service request carrying location information sent by the communication terminal 1;
obtain various optimal parameters in a SIM card to be registered corresponding to the location information of the communication terminal 1 according to the service request;
dynamically configure the various parameters in the SIM card to be registered according to various optimal parameters; and
send the dynamically configured SIM card to be registered to the communication terminal 1;
the communication terminal 1 is configured to:
receive the SIM card to be registered which includes various dynamically configured parameters from the server 2; and
search and register network for the SIM card to be registered accordingly according to the various dynamically configured parameters.

Figure 10:
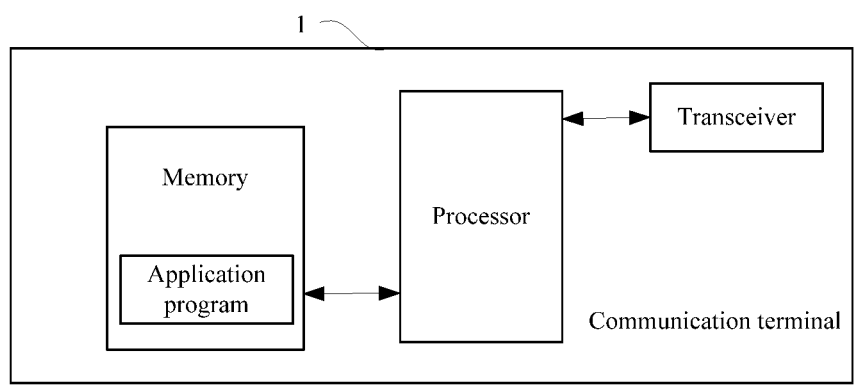
FIG. 10 illustrates a schematic block diagram of the communication terminal according to one embodiment of the present disclosure.

As shown in FIG. 10 which illustrates a schematic block diagram of the communication terminal 1 according to one embodiment of the present disclosure, the communication terminal 1 according to the embodiment of the present disclosure includes a processor configured to implement the steps in the network search and registration method provided in the various method embodiments when executing the application program stored in a memory.

The person of ordinary skill in the art can be aware of the fact that, the descriptions of the communication terminal 1 are only some examples, and don't constitute as limitation to the communication terminal 1, more or less components shown in figures can be included, or some components or different components can be combined; for example, the communication terminal 1 can also include an input and output device, a network access device, a bus, etc.

The so called processor can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, as an alternative, the processor can also be any conventional processor and the like. The processor is a control center of the communication terminal and uses various interfaces and circuits to connect to various parts of the communication terminal 1.

The memory may be used to store the application programs (instructions) and/or modules, the processor implements various functions of the communication terminal 1 by performing or executing application programs (instructions) and/or modules stored in the memory and calling the data stored in the memory. The memory may mainly include an area for storing programs and an area for data storage, wherein the area for storing programs may store an operating system and at least one function desired application program (e.g., a sound playing function, an image playing function, etc.); the area for data storage may store data (such as audio data, phone book, etc.) created according to the use of cell phone, etc. Furthermore, the memory may include high-speed RAM (Random Access Memory), and may also include non-volatile memory, such as a hard disk, a memory, a plug-in hard disk, a SMC (Smart Memory Card), a SD (Secure Digital) card, a flash card, at least one magnetic disk storage device, a flash memory device, or other volatile solid-state storage device.

The foregoing are only some preferable embodiments of the present disclosure, and should not be regarded as limitation to the present disclosure. Modifications, equivalent replacements, improvements, and the like, which are made within the spirit and the principle of the present disclosure, should all be included in the protection scope of the present disclosure.

What is claimed is:

1. A network search and configuration method, being performed on a server, comprising:
   receiving, by the server, a service request carrying location information sent by a communication terminal;
   obtaining, by the server, various optimal parameters in a subscriber identity module (SIM) card to be registered corresponding to the location information according to the service request;
   dynamically configuring the various parameters in the SIM card to be registered by the server according to various optimal parameters; and
   sending, by the server, the dynamically configured SIM card to be registered to the communication terminal in order that the communication terminal searches and registers network for the SIM card to be registered accordingly according to various configured parameters;
   wherein the various parameters comprise an operator controlled public land mobile network (OPLMM) and an user controlled public land mobile network (UPLMM);
   the step of dynamically configuring the various parameters in the SIM card to be registered by the server according to various optimal parameters comprises:
   obtaining a prioritization in a PLMN list corresponding to the location information by the server;
   dynamically configuring the OPLMN and the UPLMN in the SIM card to be registered according to the prioritization in the PLMN list by the server;
   wherein the step of obtaining the prioritization of the PLMN list corresponding to the location information by the server comprises:
   obtaining, by the server, strengths of network signals of multiple PLMNs, time spent on searching and registering network of the multiple PLMNs, and user experiences fed back by PLMNs that have been searched and registered, which are historically reported by multiple communication terminals according to the location information;
   obtaining tariff conditions of the multiple PLMNs in the PLMN list corresponding to the location information by the server; and
   determining the prioritization of the multiple PLMNs in the PLMN list by the server according to the strengths of network signals, the time spent on searching and registering network, the user experiences, and the tariff conditions.

2. The network search and configuration method according to claim 1, wherein the various parameters comprise a registered public land mobile network (RPLMN);
   the step of dynamically configuring the various parameters in the SIM card to be registered by the server according to the various optimal parameters comprises:
   obtaining a prioritization in a public land mobile network (PLMN) list corresponding to the location information by the server;
   determining whether the RPLMN stored in the SIM card to be registered is a PLMN with the highest priority in the PLMN list by the server; and
   dynamically configuring the RPLMN in the SIM card to be registered as the PLMN with the highest priority in the PLMN list by the server, if it is determined that the RPLMN stored in the SIM card to be registered is not the PLMN with the highest priority in the PLMN list.

3. The network search and configuration method according to claim 1, wherein the various parameters comprise an equivalent home public land mobile network (EHPLMN) and a home public land mobile network (HPLMN);
   the step of dynamically configuring the various parameters in the SIM card to be registered by the server according to various optimal parameters comprises:
   obtaining a HPLMN stored in the SIM card to be registered by the server;
   determining a target EHPLMN corresponding to the HPLMN stored in the SIM card to be registered by the server; and
   dynamically configuring the EHPLMN in the SIM card to be registered as the target EHPLMN by the server.

4. The network search and configuration method according to claim 1, wherein the various parameters comprise a forbidden public land mobile network (FPLMN);
   the step of dynamically configuring the various parameters in the SIM card to be registered by the server according to various optimal parameters comprises:
   obtaining, by the server, strengths of network signals of multiple PLMNs, time spent on searching and registering network of the multiple PLMNs, and user experiences fed back by PLMNs that have been searched and registered, which are historically reported by multiple communication terminals according to the location information;
   obtaining tariff conditions of the multiple PLMNs in the PLMN list corresponding to the location information by the server;
   configuring, by the server, a PLMN of which a network signal strength is weaker than a preset signal strength, a time spent on searching and registering network is longer than a preset registration time, a tariff is higher than a preset tariff, and a user experience value is lower than a preset user experience value into the FPLMN of the SIM card to be registered according to the strengths of network signals of the multiple PLMNs, the time spent on searching and registering network of the multiple PLMNs and user experiences fed back by PLMNs that have been searched and registered, which are historically reported by multiple communication terminals according to the location information.

5. The network search and configuration method according to claim 1, wherein the various parameters comprise a higher priority public land mobile network (HPPLMN) search timer;
   the step of dynamically configuring the various parameters in the SIM card to be registered by the server according to various optimal parameters comprises:
   dynamically configuring the HPPLMN search timer in the SIM card to be registered by the server according to the location information.

* * * * *